US 6,540,387 B2

(12) United States Patent  
Hashiyama et al.

(10) Patent No.: US 6,540,387 B2  
(45) Date of Patent: Apr. 1, 2003

(54) VEHICULAR HEADLAMP SYSTEM

(75) Inventors: Katsumi Hashiyama, Isehara (JP); Noboru Matsubara, Isehara (JP); Koji Futakawa, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/840,964

(22) Filed: Apr. 25, 2001

(65) Prior Publication Data

US 2001/0033495 A1 Oct. 25, 2001

(30) Foreign Application Priority Data

Apr. 25, 2000 (JP) ........................................ 2000-124406  
Apr. 17, 2001 (JP) ........................................ 2001-118533

(51) Int. Cl.⁷ .............................................. B60Q 1/00
(52) U.S. Cl. .................. 362/538; 362/539; 362/544; 362/513; 362/247
(58) Field of Search ................ 362/538, 539, 362/544, 513, 247, 243

(56) References Cited

U.S. PATENT DOCUMENTS

| | | | | |
|---|---|---|---|---|
| RE19,990 E | * | 5/1936 | Tucker | 362/553 |
| 4,511,955 A | | 4/1985 | Ernst et al. | 362/347 |
| 4,825,343 A | | 4/1989 | Nakata | 362/61 |
| 4,949,226 A | | 8/1990 | Makita et al. | |
| 5,353,204 A | * | 10/1994 | Kawamura | 362/61 |
| 5,902,039 A | * | 5/1999 | Futami | 362/539 |
| 5,967,647 A | | 10/1999 | Eichler | 362/304 |
| 5,997,163 A | * | 12/1999 | Brown | 362/553 |
| 6,019,491 A | | 2/2000 | Tsai et al. | 362/517 |
| 6,050,705 A | | 4/2000 | Kusserow et al. | 362/299 |
| 6,086,231 A | | 7/2000 | Kenjo et al. | 362/507 |
| 6,193,400 B1 | * | 2/2002 | Schuster et al. | 362/538 |
| 6,435,703 B2 | * | 8/2002 | Takada | 362/517 |
| 6,447,151 B1 | * | 8/2002 | Jones | 362/465 |

FOREIGN PATENT DOCUMENTS

| | | |
|---|---|---|
| DK | 17 03 233 | 2/1960 |
| FR | 663 429 | 8/1929 |
| FR | 1 353 038 | 2/1964 |
| FR | 2 777 064 | 10/1999 |
| GB | 2 245 697 | 1/1992 |
| JP | 58-209801 | 12/1983 |
| JP | 62-154501 | 7/1987 |
| JP | 10-199305 | 7/1998 |

* cited by examiner

Primary Examiner—Thomas M. Sember  
Assistant Examiner—Anabel Ton  
(74) Attorney, Agent, or Firm—Foley & Lardner

(57) ABSTRACT

Each of a pair of left and right lamp chambers (3) disposed at a front of a body of a vehicle (2) is constituted with an enclosing housing (4) and a transparent front cover (5) fixed to the housing (4), and accommodates therein a high-beam forming front lamp unit as a reflecting lamp (7) disposed in a front half region of the lamp chamber (3) and a low-beam forming rear lamp unit as a projecting lamp (6) disposed in a rear half region of the lamp chamber (3), the front and rear lamp units (6, 7) overlapping each other in a longitudinal direction of the vehicle (2).

9 Claims, 6 Drawing Sheets

VEHICULAR HEADLAMP SYSTEM

BACKGROUND OF THE INVENTION

1. Field of the Invention

The present invention relates to a vehicular headlamp system.

2. Description of the Related Art

There has been disclosed in Japanese Patent Application Laid-Open Publication No. 10-199305 a vehicular headlamp system including a pair of left and right lamp chambers disposed at a front of a vehicle.

Each light chamber accommodates therein a high-beam forming reflecting lamp and a low-beam forming projecting lamp vehicle-transversely spaced from each other, so that they overlap each other in a transverse direction, needing a corresponding transverse dimension for their installation.

Although each light chamber has two lamps different of function, and hence is multi-functionalized, the implementation is achieved at the sacrifice of a transverse allowance of the vehicle.

SUMMARY OF THE INVENTION

The present invention is made with such point in view. It therefore is an object of the present invention to provide a vehicular headlamp system having a light chamber multi-functionalizable by accommodation of different lamps, without significant sacrifice of a transverse allowance of an associated vehicle.

To achieve the object, according an aspect of the invention, there is provided a vehicular headlamp system comprising a lamp chamber to be provided to a vehicle, and a pair of different lamps installed in the lamp chamber, overlapping each other in a longitudinal direction of the vehicle.

According to the aspect of the invention, the lamp chamber is allowed to have a reduced transverse size to be sufficient for accommodation of one lamp that a greater transverse dimension.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
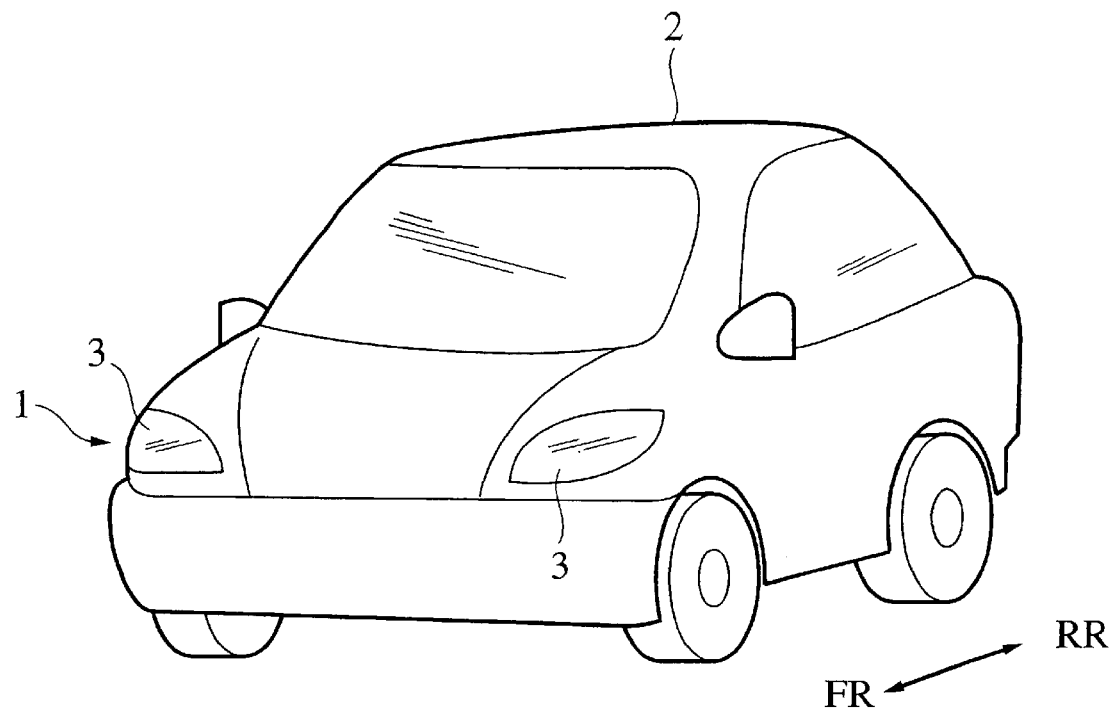
FIG. 1 is a perspective view of a vehicle equipped with a vehicular headlamp system according to an embodiment of the invention.

There will be detailed below the preferred embodiments of the present invention with reference to the accompanying drawings. In the drawings, like members are designated by like reference characters. Front, rear, upward, and downward directions are designated by FR, RR, UP, and DOWN, respectively, relative to an associated vehicle.

Figure 2:
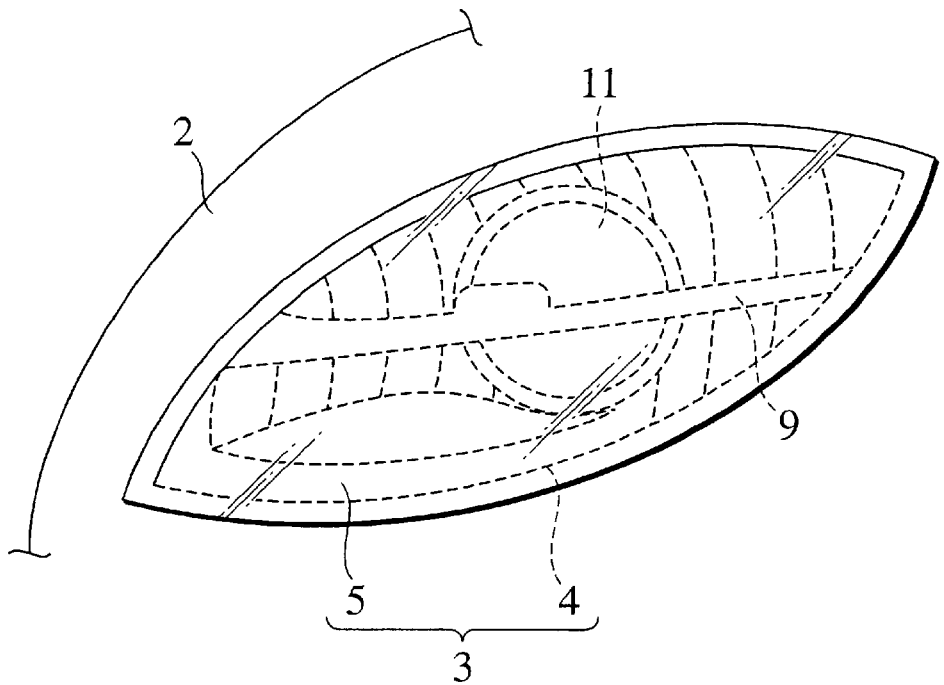
FIG. 2 is a perspective view from fore above of a lamp chamber of the vehicular headlamp system of FIG. 1.

FIG. 1 to FIG. 4 show a vehicular headlamp system 1 (FIG. 1) according to a first embodiment of the invention, which has a pair of left and right lamp chambers 3 and 3 (FIG. 1) disposed at a front of a body of a vehicle 2 (FIG. 1, FIG. 2). Each lamp chamber 3 (FIG. 2) is constituted (like 103 in FIG. 8) with an enclosing housing 4 (FIG. 2) having (like 104 in FIG. 8) a relatively large cat's eye shaped front opening and a relatively small circular capped rear opening, and a transparent front cover 5 (FIG. 2) rearwardly slightly curved and fixed (like 105 in FIG. 8) to the front opening of the housing 4.

The lamp chamber 3 accommodates therein (FIG. 4) a high-beam forming front lamp unit (as a reflecting lamp) 7 disposed (like 107 in FIG. 8) in a front half region of the lamp chamber 3, and a low-beam forming rear lamp unit (as a projecting lamp) 6 disposed (like 106 in FIG. 8) in a rear half region of the lamp chamber 3.

The rear lamp unit (as a projecting lamp) 6 is constituted with a PES (polyellipsoid-system) concave reflector 12 (FIG. 4), an HID (high-intensity gaseous discharge) bulb 13 (FIG. 4) as a light source plugged to the reflector 12 so that its light-emitting part is located in a vicinity of a first focal point F (FIG. 4) on an optical axis Z (FIG. 4) of the reflector 12, a substantially cylindrical lens holder 14 (FIG. 4) fixed for integration at its rear end to a periphery of a front opening of the reflector 12, and an objective 11 (FIG. 2, FIG. 3, FIG. 4) as a projecting convex lens, circular in front view, having (like 111 in FIG. 8) its optical axis Z (FIG. 3, FIG. 4) aligned and common to that of the reflector 12.

The objective 11 has its focal point coincident with a second focal point on the optical axis Z of the reflector 12, where a top of an upwardly bent light shade 15 (FIG. 4) is located. The shade 15 serves as a screen to interrupt light beams lower than the top, while light beams striking the reflector 12 from the bulb 13, like arrow 'a (FIG. 4)', and reflected as direct incident beams to the objective 11, like arrow 'b (FIG. 4)', are projected through the objective 11 to constitute a low-beam light distribution pattern such that a range of projected light higher than the optical axis Z is dark relative to a lower range under the optical axis Z, that is, with a light/dark cutoff plane along the vertical axis Z.

The front lamp unit (as a reflecting lamp) 7 is constituted with a bulb 8 (FIG. 3, FIG. 4) arranged (like 108 in FIG. 8) in a rearward oriented position for rearward emission of light at a slightly higher level than the optical axis Z of the rear lamp unit 6, a vertically angled or narrow metallic strip 9 (FIG. 2, FIG. 3, FIG. 4) as a horizontal extension (like 109 in FIG. 8) bridged between left and right ends of the front opening of the housing 4 and formed with a circular bulged central part for supporting the bulb 8, and a free-form reflector 10 (FIG. 3, FIG. 4) opened (like 110 in FIG. 8) at its front end to be loose-fit in the front opening of the housing 4 and converged at its rear end to have a circular opening fitted on a lens holding front end of the lens holder 14 of the rear lamp unit 6. Beams of light reflected by the reflector 10 provide a high-beam light distribution pattern.

According to the first embodiment, as the reflecting lamp 7 and the projecting lamp 6 are arranged in a front to rear relationship to each other, allowing for each lamp chamber 3 to have a reduced transverse size, with a decreased proportion to a transverse width of the vehicle 2, and with an increased adaptation for recognition of a clearance. It is noted that the projecting lamp 6 and the reflecting lamp 7 overlap each other in a longitudinal direction of the vehicle 2 to which the optical axis Z is parallel.

The bulb 8 is supported in the rearward oriented position on or in front of a plane connecting upper and lower front edges of the reflector 10, by the vertically narrow extension 9 bridging in front of a plane connecting upper and lower front edges of the housing 4, whereby the reflecting lamp 7 placed in front of the projecting lamp 6 is allowed to exhibit its performances, as well as the projecting lamp 6 placed behind the reflecting lamp 7.

The location of the bulb 8 of the reflecting lamp 7 resides outside a lower half region below the optical axis Z of the objective 11, where the objective 11 has its most utilized surface area for projection of light of the projecting lamp 6, whereby the projecting lamp 6 is allowed to project an adequate quantity of light without interruption. For one standing in front of the light chamber 3, looking down this, peripheral components of the bulb 8 disposed in an upper half region above the optical axis Z are effectively hidden from the sight by the extension 9, whereby the headlamp system 1 is allowed to have a maintained appearance.

Although the light chamber 3 has a decreased transverse width, a proportion of light from the projecting lamp 6 strikes the reflector 10 of the reflecting lamp 7, whereby the light chamber 3 has an illumination area equivalent to a sum of those of the objective 11 and the reflector 10 and greater than that of the objective 11, with an enhanced visibility as well as an improved recognition such as for a car on the opposite lane or a pedestrian standing on the road to see the vehicle 2 coming at an apparently near distance or for a crossing car or pedestrian before the vehicle 2 to be sufficiently aware of the vehicle 2 to feel an increased hesitation, resulting in an increased safety.

Figure 3:
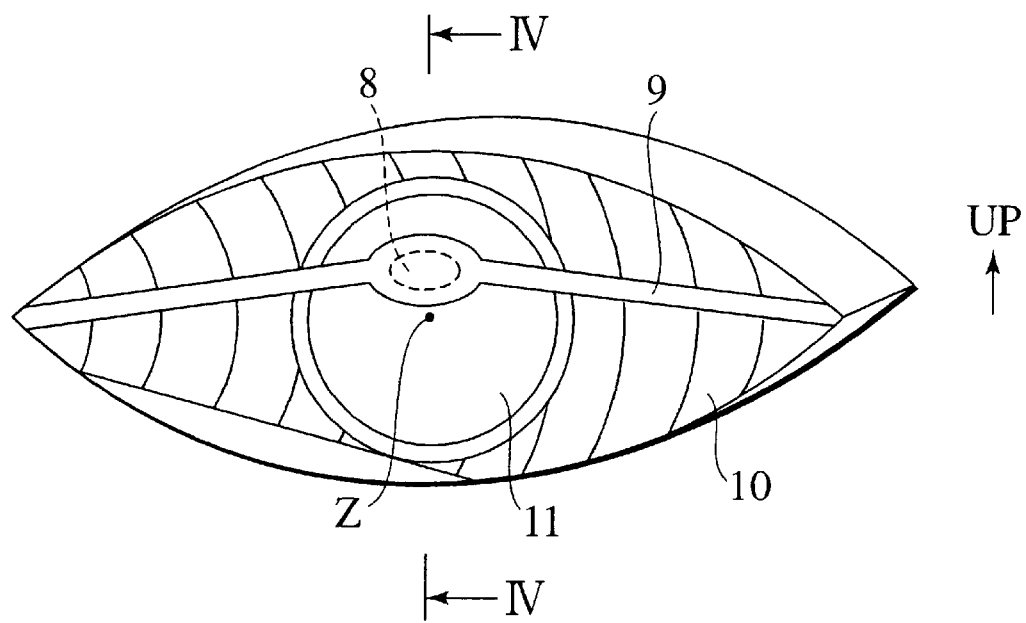
FIG. 3 is a front view of the lamp chamber of FIG. 2, with a front cover removed, as the front view is rotated to a horizontal position.
Figure 4:
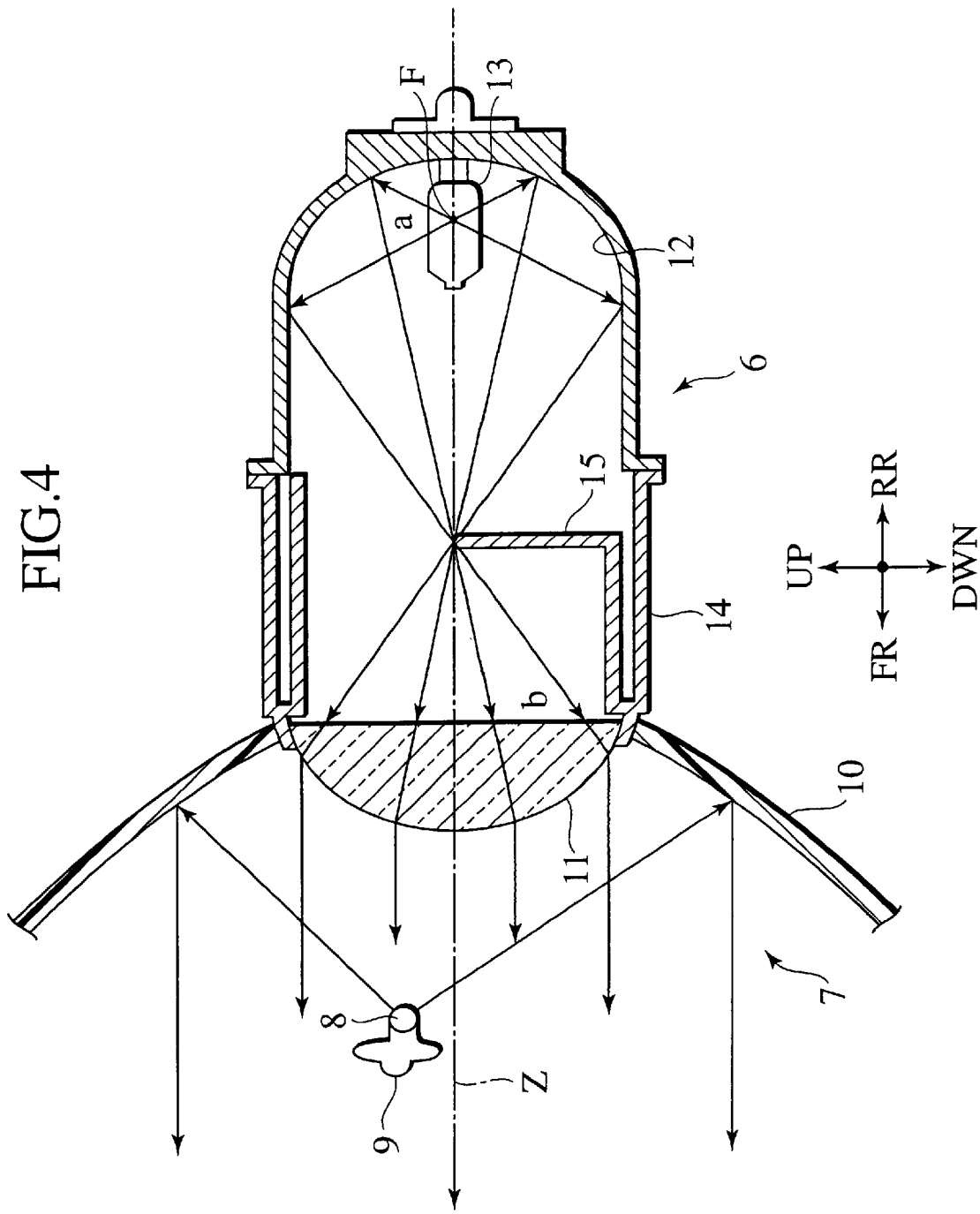
FIG. 4 is a longitudinal section along line IV—IV of FIG. 3, showing a combination of lamps in the lamp chamber of FIG. 3.
Figure 5:
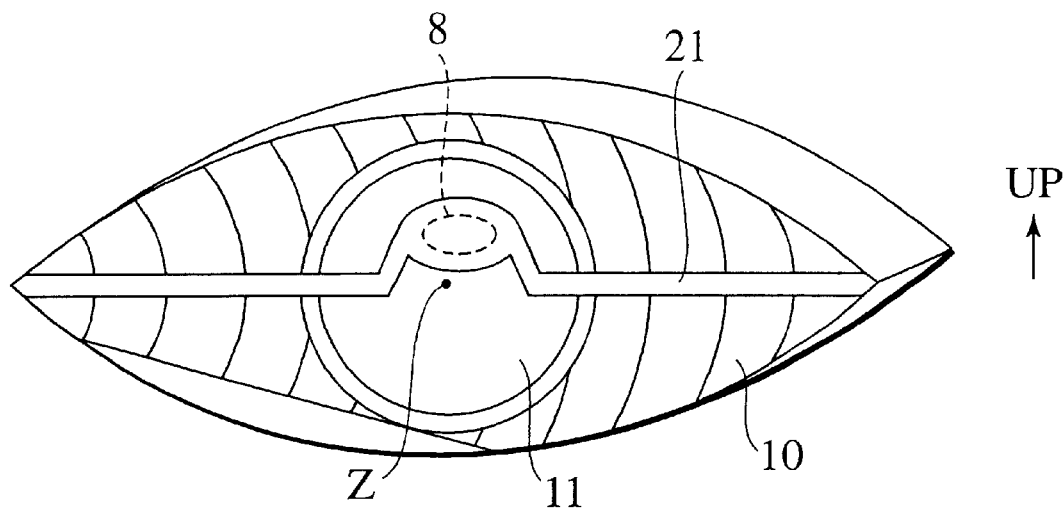
FIG. 5 is a front view of a lamp chamber of a vehicular headlamp system according to another embodiment of the invention, as the front view is rotated to a horizontal position.

The extension 9 is moderately curved to apparently constitute a chord of an upper half of a circular circumference of the objective 11, as illustrated by FIG. 2 and FIG. 3. Such a configuration of the extension does not always constitute a limitation to the invention, and may well be modified as follows:

FIG. 5 shows a partially raised extension 21 in a light chamber of a vehicular headlamp system according to a second embodiment of the invention, in which the extension 21 lies substantially on a dark/light cutoff line or on a plane including an optical axis Z of an objective 11, a right transverse end of a reflector 10 centered to the optical axis Z, and a left transverse end of a cat's eye shaped front opening of the lamp chamber, while a central part of the extension 21 is raised in a relatively dark region above the optical axis Z to support a bulb 8 in position.

Figure 6:
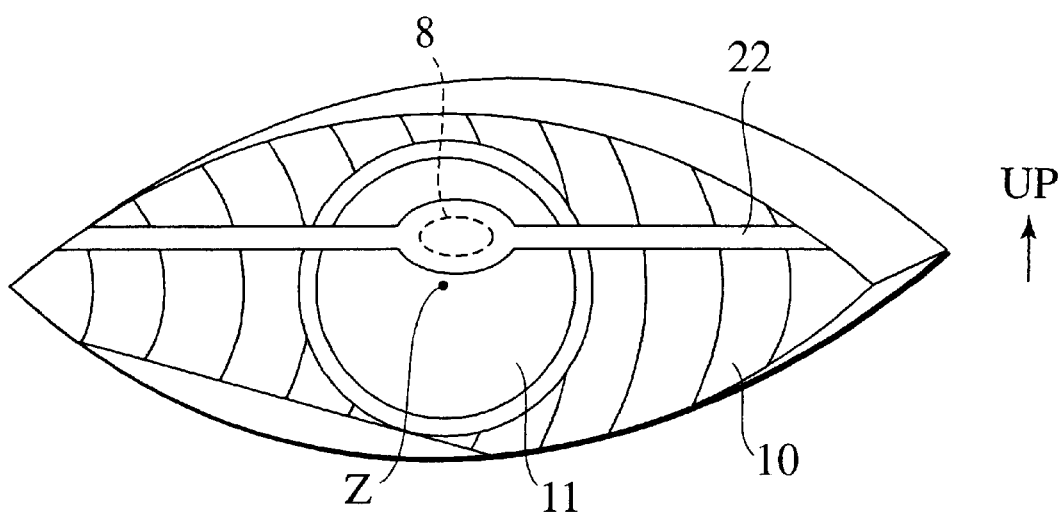
FIG. 6 is a front view of a lamp chamber of a vehicular headlamp system according to another embodiment of the invention, as the front view is rotated to a horizontal position.

FIG. 6 shows a substantially straight extension 22 in a light chamber of a vehicular headlamp system according to a third embodiment of the invention, in which the extension 22 is parallel at an upward spaced position relative to a dark/light cutoff line or a plane including an optical axis Z of an objective 11, a right transverse end of a reflector 10 centered to the optical axis Z, and a left transverse end of a cat's eye shaped front opening of the lamp chamber, so that a central part of the extension 22 is placed in a relatively dark region above the optical axis Z to support a bulb 8 in position.

Figure 7:
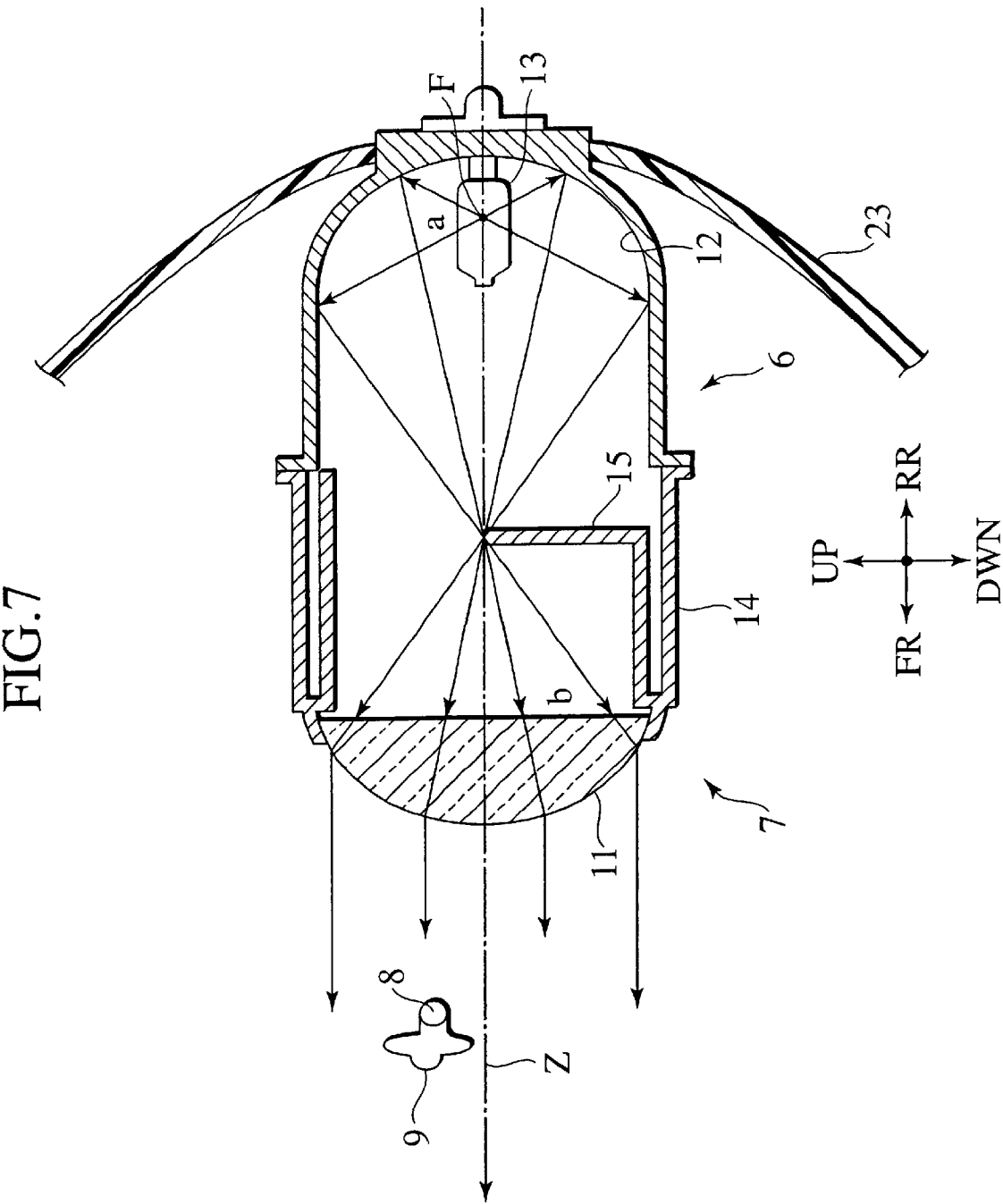
FIG. 7 is a longitudinal section of a combination of lamps in a light chamber of a vehicular headlamp system according to another embodiment of the invention.
Figure 9:
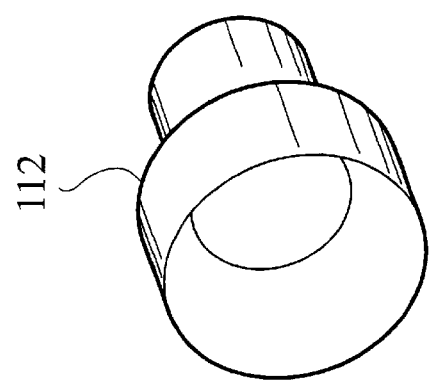
FIG. 9 is a perspective view of a reflector of a projecting lamp in the light chamber of FIG. 8.

Further, although, in the first embodiment, the reflector 10 is converged at the rear end on a periphery of a front end of the lens holder 14 of the projecting lamp 6, such a configuration of the reflector does not always constitute a limitation to the invention, and may well be modified as follows:

FIG. 7 shows a reflector 23 of a reflecting lamp 7 in a lamp chamber of a vehicular headlamp system according to a fourth embodiment of the invention, in which the reflector 23 is converged at its rear end on a periphery of a housing which is formed, about a plug insertion part for a gaseous-discharge bulb 13, as a rear end part of a PES concave reflector 12 of a projecting lamp 6. It is noted that a bulb 8 of the reflecting lamp 7 is placed in front of an objective 11 of the projecting lamp 6, in an upper region above an optical axis Z of the projecting lamp 6, like the first embodiment. It will be seen that the fourth embodiment may well be modified like the second or third embodiment.

Figure 8:
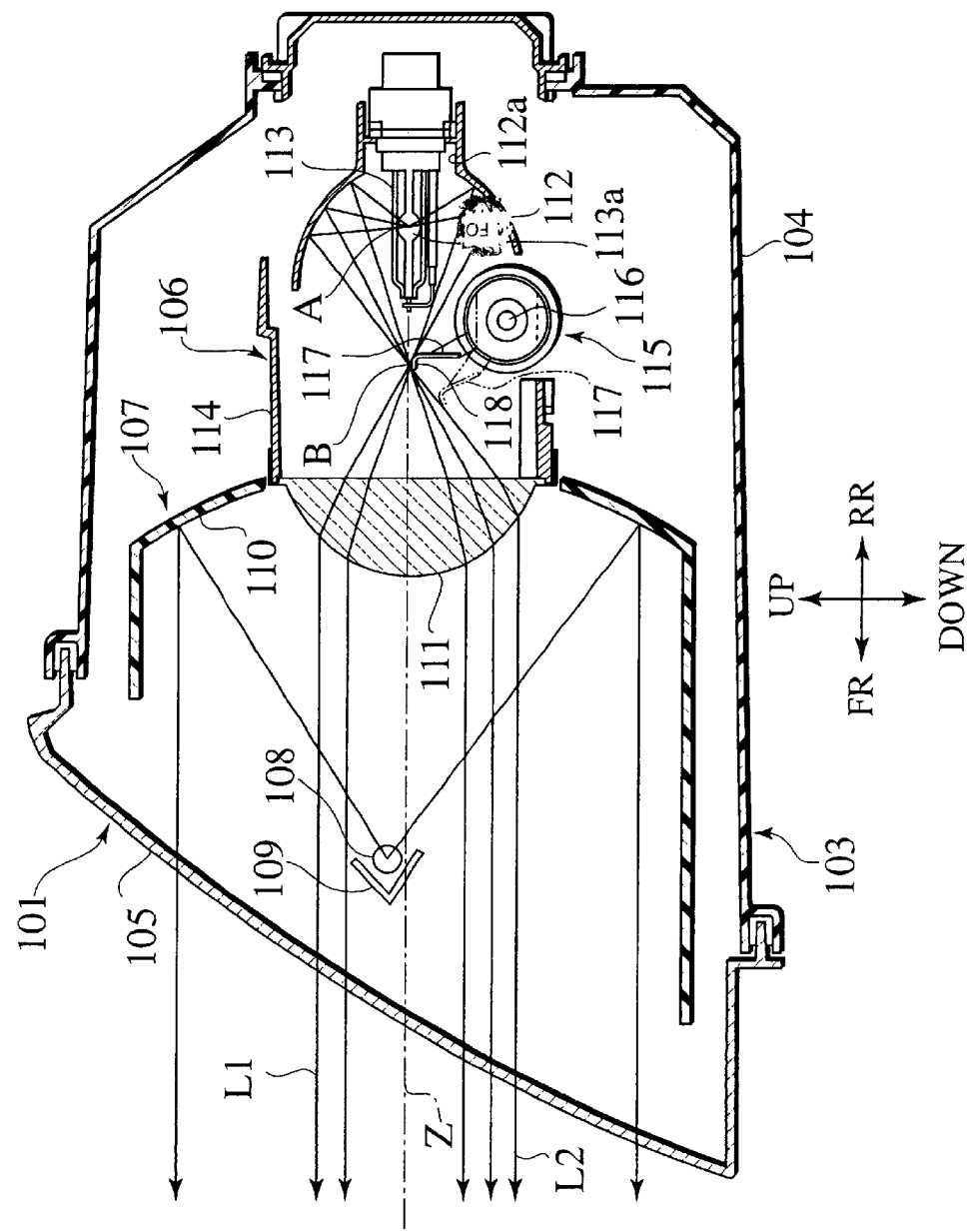
FIG. 8 is a longitudinal section of a light chamber of a vehicular headlamp system according to another embodiment of the invention.

Still more, although, in the first embodiment, the front lamp unit 7 is constituted as a high-beam forming lamp having a bulb 8 therefor and the rear lamp unit 6 is constituted as a low-beam forming lamp having a fixed shade 15, such constitution is not always a limitation to the invention, and may well be modified as follows:

FIG. 8 shows in section an entirety of a light chamber 103 in a vehicular headlamp system 101 according to a fifth embodiment of the invention, in which a front lamp unit (as a reflecting lamp) 107 constitutes a clearance lamp and a rear lamp unit (as a projecting lamp) 106 is adapted to provide a selective one of high-beam and low-beam light distribution patterns.

The lamp chamber 103 is constituted with an enclosing housing 104 having a relatively large cat's eye shaped front opening and a relatively small circular capped rear opening, and a transparent front cover 105 rearwardly slightly curved and fixed to the front opening of the housing 4.

The lamp chamber 103 accommodates therein a vehicle-clearance defining front lamp unit (as the reflecting lamp) 107 disposed in a front half region of the lamp chamber 103, and a high/low-beam selectively forming rear lamp unit (as the projecting lamp) 106 disposed in a rear half region of the lamp chamber 103.

The rear lamp unit (as the projecting lamp) 106 is constituted with a PES concave reflector 112, an HID bulb 113 as a light source plugged to a circular receptacle part 112$a$ of the reflector 112 so that its light-emitting part 113$a$ is located in a vicinity of a first focal point A on an optical axis Z of the reflector 112, a substantially cylindrical lens holder 114 fixed for integration at its rear end to a periphery of a front opening of the reflector 12 and/or supported by a suitable member (not shown) fixed to the housing 104, an objective 111 as a projecting convex lens, circular in front view, having its optical axis Z aligned and common to that of the reflector 112, and a rotary solenoid 115 having a light shade 117 rotatable about a transversely extending pivot shaft 116.

The objective 111 has its focal point coincident with a second focal point B on the optical axis Z of the reflector 112, where a forewardly bent top 118 of the light shade 117 is located, when it is set in a high position (solid line) for selection of a low-beam light distribution pattern (with light beam L2 inclusive) by electrical operation of the rotary solenoid 115 to rotate clockwise about the shaft 116 to a rear angular position. For a high-beam light distribution pattern (with light beams L1 and L2 inclusive) to be selected, the shade 117 is set to a low position (phantom line) by manual or controlled operation of the rotary solenoid to rotate counterclockwise about the pivot shaft 116 to a front angular position.

The front lamp unit (as the reflecting lamp) 107 is constituted with a clearance bulb 108 arranged in a rearward oriented position for rearward emission of light at a slightly higher level than the optical axis Z of the rear lamp unit 106, a vertically angled or narrow metallic strip 109 as a horizontal extension bridged between left and right ends of the front opening of the housing 104 and formed with a circular bulged central part for supporting the bulb 108, and a free-form reflector 110 opened at its front end to be loose-fit in the front opening of the housing 104 and converged at its rear end to have a circular opening fitted on a lens holding front end of the lens holder 114 of the rear lamp unit 106.

Beams of light reflected by the reflector 110 provide an enhanced definition of a vehicle clearance, as the light chamber 103 has a decreased transverse size. It is noted that the clearance bulb 8 is located at a slightly higher level than the optical axis Z, where the density of light flux is relatively small because the receptacle part 112a of the reflector 112 is a dark part (like a hole). It will be seen that the fifth embodiment may be modified like the second, third, or fourth embodiment to achieve corresponding effects.

While preferred embodiments of the present invention have been described using specific terms, such description is for illustrative purposes, and it is to be understood that changes and variations may be made without departing from the spirit or scope of the following claims.

What is claimed is:

1. A vehicular headlamp system comprising:
    a lamp chamber to be provided to a vehicle; and
    a pair of different lamps, installed in the lamp chamber, overlapping each other in a longitudinal direction of the vehicle,
    wherein the pair of different lamps include a front lamp comprising a reflecting lamp and a rear lamp comprising a projecting lamp, and
    wherein the reflecting lamp is configured to provide a high-beam light distribution pattern, and the projecting lamp is configured to provide a low-beam light distribution pattern.

2. A vehicular headlamp system according to claim 1, wherein the projecting lamp has a lens holder for holding an objective, and the reflecting lamp has a reflector converged on a front end of the lens holder.

3. A vehicular headlamp system according to claim 1, wherein the projecting lamp has an extension raised for supporting the bulb.

4. A vehicular headlamp system according to claim 1, wherein the projecting lamp has a substantially straight extension for supporting the bulb.

5. A vehicular headlamp system comprising:
    a lamp chamber to be provided to a vehicle; and
    a pair of different lamps installed in the lamp chamber, overlapping each other in a longitudinal direction of the vehicle,
    wherein the pair of different lamps include a front lamp comprising a reflecting lamp and a rear lamp comprising a projecting lamp, and
    wherein the reflecting lamp is configured to serve as a clearance lamp, and the projecting lamp is configured to provide a selective one of a high-beam light distribution pattern and a low-beam light distribution pattern.

6. A vehicular headlamp system according to claim 5, wherein the projecting lamp has a lens holder for holding an objective, and the reflecting lamp has a reflector converged on a front end of the lens holder.

7. A vehicular headlamp system according to claim 5, wherein the projecting lamp has an extension raised for supporting the bulb.

8. A vehicular headlamp system according to claim 5, wherein the projecting lamp has a substantially straight extension for supporting the bulb.

9. A vehicular headlamp system comprising:
    a lamp chamber to be provided to a vehicle; and
    a pair of different lamps, installed in the lamp chamber, overlapping each other in a longitudinal direction of the vehicle,
    wherein the pair of different lamps include a first lamp comprising a reflecting lamp and a second lamp comprising a projecting lamp, and
    wherein the reflecting lamp is configured to provide a high-beam light distribution pattern, and the projecting lamp is configured to provide a low-beam light distribution pattern.

* * * * *